United States Patent
Cartwright et al.

[15] 3,688,080
[45] Aug. 29, 1972

[54] WELDING

[72] Inventors: Andrew John Cartwright; Frederick Timothy Cartwright; Peter Charles St. John Cartwright, all of 56, Old Mutual Bldg., President Street, Germiston, Transvaal, South Africa

[22] Filed: Aug. 31, 1970

[21] Appl. No.: 68,244

[30] Foreign Application Priority Data

Sept. 8, 1969 South Africa ............. 69/6362

[52] U.S. Cl. ............................... 219/137, 219/160
[51] Int. Cl. .............................................. B23k 9/00
[58] Field of Search ........................... 219/137, 160

[56] References Cited

UNITED STATES PATENTS

| | | | |
|---|---|---|---|
| 3,192,357 | 6/1965 | Duffy et al. | 219/160 X |
| 3,525,844 | 8/1970 | Johnson | 219/160 X |
| 2,796,843 | 6/1957 | Kleppinger | 219/160 X |
| 3,432,915 | 3/1969 | Doyle | 219/160 X |

*Primary Examiner*—J. V. Truhe
*Assistant Examiner*—Hugh D. Jaeger
*Attorney*—Young & Thompson

[57] ABSTRACT

A method of welding wherein molten weld material, directed under the influence of heat along a weld zone extending from one side to the other of a workpiece, is reflected back by a screen located on the other side of the workpiece. The weld material in the zone of the root of the weld and substantially throughout the remainder of the body of weld material is maintained in a molten condition for a period of time sufficient to permit intimate fusion between weld material and parent material at the root and substantially throughout the remainder of the weld. The method is particularly suited for forming button welds. The completed weld has the cross-sectional configuration of an hourglass.

9 Claims, 5 Drawing Figures

PATENTED AUG 29 1972 3,688,080

WELDING

This invention relates to welding.

Button welding, or spot welding as it is also called, is well known and is often used to secure two or more pieces of metal face to face to one another. Normally, in order to button weld two metal plates together, they are first placed against one another and heat with or without extraneous filler metal, is then applied in a localized zone on the outside of one of the plates so that molten weld metal passes through that plate and penetrates at least partially into the second plate to form a rivet-like plug of weld metal acting to hold the two plates together. Normally, the plug does not pass right through the second plate so that the longitudinal cross-section of the plug is generally V-shaped with a rounded apex located in the proximity of the outer surface of the other plate.

It is well known to use an inert shielding gas and that the type of shielding gas used and other variables determine the characteristic weld metal configuration for any particular method of welding.

It has been found that where a button weld is applied by means of an electric arc with carbon dioxide as the inert shielding gas, the duration of arc application and the amperage of the welding current determine the depth of penetration, while the duration of arc application and the voltage applied determine the diameter of the plug at any given point along its length. It will be appreciated that generally speaking the diameter of the plug at the interface of the two plates determines the shear strength of the weld, while the depth of penetration into the second plate largely determines the strength of the weld against transverse separation of the plates. Normally, the thicknesses of the two plates being welded together constitute a limiting factor on the permissible duration of the welding operation and thus on the plug diameter at the plate interface.

It is generally found that rolled plates of metal suffer from directionality (anisotropy) and exhibit maximum grain cohesion between planes in the metal which are disposed at right angles to the direction of rolling and minimum grain cohesion between planes in the metal which are disposed parallel to the rolling plane. In other words, a sheet of protuberance. metal normally exhibits minimum grain cohesion in a direction transversely to its own general plane and longitudinally with respect to the plug formed by a button weld extending transversely to the plate. It has been found that with the substantially V-shaped formation of the plug of a conventional button weld, the securing effect of such a button weld in its own longitudinal direction transversely to the plate is limited.

Wrought metals in forms other than flats also suffer from directionality to varying degrees.

In an attempt to increase the overall length and the diameter at a given point along its length of the plug obtained with button welding, the weld has been carried right to the outer face of the second of two plates being secured together face to face. This procedure suffers from the disadvantage that molten metal falls or blows through the root of the weld at the outer face of the second plate with the result that an inferior weld is obtained.

In order to avoid such blow-through at the root of the weld, it has been suggested, as in U.S.A. Pat. Specification No. 3,001,057 for the welding of aluminum to provide a non-metallic, heat resisting material to cover and support the underside of the welding area. The welding operation must be controlled carefully where such non-metallic supporting surfaces are used, so that the period of time during which molten weld metal is presented to the supporting surface is of limited duration only. For example, in the arrangement of U.S.A. Pat. Specification No. 3,001,057, the supporting material comprises woven glass fiber tape or like woven material permeable to the flow of gas therethrough. It will be appreciated that the nature of this material is such that although it is heat resistant, it cannot withstand high temperatures, such as those necessary for the melting of metals such as steel, for any appreciable length of time. Therefore, if glass fiber tape is to be used for the welding of steel or the like, the welding operation needs to be closely controlled so that the weld just reaches the supporting material without subjecting it to destructive conditions.

Since the application of heat to the supporting material is restricted, it is generally found that incomplete fusion between parent metal and weld metal occurs at the root of the weld. Although the weld might penetrate through the second plate, the strength and effectiveness of the weld is normally impaired by root cracks.

It has been suggested to use a metallic backing or chill member for seam welding in the manner disclosed in U.S.A. Pat. Specification No. 1,886,643. As its name implies, a chill member acts to cool weld metal coming into contact with it, thereby to cause solidification of the weld metal at the root of the weld and prevent blow-through or fall-through of molten metal. As a result of the rapid cooling that occurs at the chill member, incomplete fusion between weld metal and parent metal occurs with a resultant tendency for root cracks to occur.

Hitherto, backing members have been used in welding operations to support molten weld metal while it solidifies. Where the backing member is spaced from a workpiece at the root zone of a weld, such as is shown in FIGS. 3 and 4 of U.S.A. Pat. Specification No. 2,916,001 molten weld metal flows into the space between the workpiece and the backing to form a convex underbead, the corners of the workpiece at the root being slightly rounded by melting due to heating during the welding process. If the welding operation and particularly its duration, is not controlled carefully, molten weld metal will spew sideways between the backing and the workpiece to create an unwanted protruberance.

Alternatively, if the backing member is located in contact with the workpiece at the root zone, a concave underbead is formed as is described in U.S.A. Pat. Specification No. 2,916,001. In this case, the corners at the root of the weld are not rounded by melting. The concavity in the underbead is formed in much the same manner as a pipe in an ingot when it cools upon solidification in an ingot mould. The parent metal of the workpiece being welded has a chilling effect on the weld metal which cools from the outer regions inwardly as does an ingot in an ingot mould. The configuration of the weld metal is such that during cooling, stresses are set up longitudinally in the vicinity of the joins between the parent and weld metals, and also transversely towards the root of the weld. The transverse stresses at the root of the weld are due to the greater transverse movement which occurs at the wider zone of the body of weld metal at the side of the workpiece opposite to the root from which welding is being conducted. The uneven transverse shrinkage has a warping effect and as a result the root zone of the weld is highly stressed and ruptures in many instances. The same effect takes place where a root run or other light run is made using a ceramic backing against the workpiece at the root position, but to a lesser extent.

It has also been found that seam welding, such as is used in the production of pipes, is often time-consuming and difficult. This is particularly the case with pipes used in the petroleum industry where the weld has to comply with most stringent requirements to ensure that no dangerous leakage of explosive fluid can occur. Root cracks cannot be tolerated under any circumstances on petroleum pipes.

Seam welding of large diameter pipes normally entails the longitudinal welding of the seam by means of an extraneous filler metal, both on the inside and the outside of the pipe in two separate operations. In the petroleum industry, it is known to seam weld by means of so-called diffusion welding in which no extraneous filler metal is used but the parent metal on opposite sides of the seam is fused together under the influence of heat and pressure. Diffusion welding is an expensive and highly skilled procedure.

It is an object of the present invention to avoid or at least to minimize the above disadvantages.

It is a further object of the invention to provide an improved button weld which can be used to replace rivets or permanent bolts. Another object of the invention is to provide an improved seam weld made from one side only.

According to the present invention a method of welding includes the steps of directing molten weld material under the influence of heat along a weld zone extending from one side to the other of at least one workpiece reflecting molten weld material and heat back from the other side of the workpiece against the direction of welding; and maintaining weld material in the zone of the root of the weld and substantially throughout the remainder of the body of weld material in a molten condition for a period of time sufficient to permit intimate fusion between weld material and parent material at the root and substantially throughout the remainder of the weld.

By reflecting molten weld material and heat back from the other side of the workpiece against the direction of welding, the weld material at the root of the weld and substantially throughout the remainder of the weld, can be maintained in a molten state to produce intimate fusion between weld material and parent material. Furthermore, the reflection of molten weld material against the direction of welding, tends to produce a circulation of molten material, thereby to homogenize the weld material. In effect, the process according to the invention turns the molten weld material into a melting furnace charge.

It will be appreciated that with the method according to the invention, the resultant body of weld material extends from the one side to the other of the workpiece.

Due to the reflection of molten weld material at the root of the weld, the transverse dimensions of the body of weld material can be controlled to suit particular requirements and can be increased as compared with the dimensions of conventional welds. Preferably, the molten weld material is caused to flare transversely at least in the zone of the root with respect to the body of weld material passing through the workpiece. As a result, a head may be formed within the workpiece on the body of weld material on the other side of the workpiece and on which the weld material emerges from the workpiece. It will be appreciated that such a head retains the body of weld material firmly in the workpiece against separation of the weld body and the workpiece in the direction in which welding is performed.

By suitably controlling the reflection of the weld material the latter may be flush with or project outwardly from the face of the workpiece on which the weld material emerges.

Further according to the invention the molten weld material is directed under the influence of heat through at least one workpiece from one side to the other thereof to produce a button or puddle weld in the workpiece.

The weld material and heat may be reflected by a screen made of suitable reflective material. The screen is preferably composed of a material which is resistant to heat and to the weld material, has a low heat absorption so that it may reflect weld material as well as heat and is inert so as not to give off gas or any liquid or solid contaminating substance. The screen may comprise porcelain, fiberglass, cermet or ceramic. The screen may be composed entirely of the reflective material and thus be of monolithic structure, or may comprise reflective material mounted on a suitable substrate, such as metal. In the latter case, the reflective material may comprise a ceramic which is flame sprayed onto the substrate. Alternatively, a reflective ceramic powder may simply be placed on a fresh substrate or on a used monolithic screen or a used screen comprising reflective material flame sprayed on a substrate.

The screen may have any suitable shape. Thus, the screen may have a plane surface so that the weld material is formed substantially flush with the face of the workpiece at which the weld material emerges. Alternatively, the screen may present a recessed formation so that at the emerging face of the workpiece the body of weld material is formed with a projecting end.

It will be appreciated that the screen in effect acts as a reverberating furnace member which reflects heat applied to it back into the body of the weld in order to maintain molten weld material in a molten condition. It will be appreciated that by keeping the weld material at a suitably elevated temperature, parent material in contact with the molten weld material is melted to cause intimate fusion between parent material and weld material.

Tests by Applicants have shown that where a screen with a plane reflecting face is placed against a workpiece at the root of a weld, the weld material at the root is flush with the workpiece, without a cavity or crater after cooling. In addition, stressing is virtually non-existent, with the result that fracturing does not occur, or is at least minimized. This is due to the configuration of the weld, the ductility that can be achieved and the improved fusion between weld and parent materials which allow more even solidification during cooling.

According to a further feature of the invention, a suitable additive, such as a control agent for deoxidization, grain refinement, stabilization, rust resistance, alloying or the like, may be introduced into molten weld material reflected back from the root of the weld.

Where the molten weld material is reflected back by means of a screen, additive material in any suitable form, such as powdered or solid strip form, may be located between the workpiece and the screen in the area of the weld root before welding commences.

By suitable controlling the reflectivity of the screen and/or the duration of the welding operation and/or the amperage and/or voltage of the welding current in the case of electric arc welding of a metal workpiece, the extent of the "furnace melting" operation may be controlled.

It is contemplated that reflection may take place right back to the surface from which the welding is performed and may then be re-directed from that surface in the original direction of welding.

A reflective screen generally similar to that at the primary reflecting surface may be provided at the welding surface. The screen at the welding surface may be provided with an aperture through which welding may be performed. Thus, an arc welding rod may pass through the aperture.

The extent of reflection back from the welding surface may be controlled to suit particular requirements. For example, a head of increased size may be formed within the workpiece at the welding surface.

If required, weld materials may be reflected backwards and forwards a plurality of times. It will be appreciated that the extent and manner of reflection will determine the final configuration of the body of weld material.

Apart from increasing the strength of the weld by improving the shape and/or dimensions of the body of weld metal, the metallurgical properties of the weld metal and/or the parent metal, as well as the fusion between the parent and weld metals can be improved in the case of the welding of a metal workpiece, by suitably controlling the reflection of the weld metal. Thus, porosity of the weld metal may be reduced and the crystalline structures of the weld metal and of the parent metal adjacent the weld metal may be improved. Also, the ductility of the weld may be improved. This is a very important feature in applications such as the button or seam welding of ships hulls.

The method according to the invention may be used for localized welding, such as button and puddle welding, as well as for intermittent longitudinal welding, such as stitch welding, and also for continuous longitudinal welding, such as seam welding.

Welding according to the invention may be applied in a groove or other recess such as may be the case in seam welding, or to an outer surface of a workpiece which has not been specially prepared, such as may be the case with button welding or even seam welding.

Welding according to the invention may be used to secure two or more workpieces together. The workpieces may be flat sheets, plates or the like which are secured together in juxtaposition. Alternatively, workpieces such as for example, strips, plates, sheets or the like may be secured together at angles to one an other. Thus, two flat strips of metal may be secured together in T-formation at right-angles to one another, a pair of welds according to the invention which are disposed at about 45° to the two strips of metal and substantially at right-angles to each other being provided at the junction between the two strips.

It will be appreciated that the workpieces need not be flat but may be of any suitable shape, such as angle-section, channel-section or round-section.

A weld according to the invention may also be applied to a single workpiece in order to bind planes of weak grain cohesion together. One or more button welds may be used for this purpose.

Seam welding according to the invention may be applied through a solid workpiece or through two or more solid workpieces. Such a seam weld may also be used joining together two edges which are in abutting or slightly spaced relationship.

A seam weld according to the invention is particularly advantageous in pipe production since a separate internal welding operation is not required. Such a weld may extend longitudinally or transversely to the pipe.

The reflective screen or screens may be arranged to suit the type of weld being performed. Thus, one or a plurality of spaced screens of limited cross-sectional area may be provided for one or a plurality of spaced simultaneous button or puddle welds. For seam welding, an elongated, stationary screen may be provided along each reflecting surface. Where reflection is required at the seam welding surface, an aperture in the nature of an elongated slot may be provided in the elongated screen at the welding surface. Alternatively, one or more screens of localized cross-sectional area may be provided for seam welding, the workpiece being movable relative to the screen/s and welding apparatus or the screen/s and welding apparatus being movable relative to the workpiece. Where reflection is required at the welding surface, the screen at the welding surface may be provided with a localized aperture, therethrough.

The method according to the invention may be used for welding material other than metal.

Apart from the reflection feature, welding according to the invention may be performed by any suitable method, such as tungsten inert gas welding (TIG), metal inert gas welding (MIG), electron beam welding (EB) and submerged arc welding.

It is often difficult, if not impossible, to determine the effectiveness of a weld without conducting destructive tests. It is believed that the extent and position of the exposed area of the weld material at the root of a weld according to the invention, will give a valuable non-destructive indication of the quality of the weld.

The welding of a stud over a button weld in a wrought metal base performed according to the invention or the building of a structure on a wrought metal base which has been button and/or seam welded according to the invention would minimize failure were the metal base suffers from excessive directional weaknesses.

High quality welds according to the invention can be made on members where available space allows of welding from one side only, i.e. where a seal weld cannot be carried out from the side opposite to the first weld as is required with conventional welding.

Seam welds performed according to the present invention eliminate the difficulty experienced in aligning welds which are performed from opposite sides in conventional manner.

With welding according to the invention, any external protrusions of weld metal may be avoided or removed. Where an object, such as a railway truck or a ship, involves considerable welding, such avoidance or removal of the external projections can decrease weight considerably. A considerable saving in weight can thus be achieved by welding according to the invention in the construction of ships and railway trucks.

It has also been found that with rivetted plates subjected to damp conditions, rusting tends to start underneath the rivet heads. By using button welds according to the invention and avoiding or removing any external projections, rusting can be inhibited.

In applications, such as the welded construction of ships, a certain degree of relative movement between certain adjacent plates or members which are secured together, is often required in order to minimize excessive stiffness in the structure. This requirement is often referred to in the art as "breathing."

According to a further feature of the invention such "breathing" may be achieved by interposing a spacer between two workpieces to be welded together in the zone of the weld; and applying a weld according to the invention to pass through the two workpieces and the spacer, the weld material fusing with the two workpieces but not with the spacer.

This may be achieved by providing an aperture in the spacer in the zone of the weld which is of larger cross-sectional dimensions then the body of weld material initially passing through the spacer but which is filled up with weld material on completion of the reflecting action. When the weld material cools it contracts in the spacer aperture leaving a clearance between the weld material and spacer aperture walls.

The spacer may be composed of a material which is resistant to fusion with the weld material, or alternatively, the surrounds of the aperture may be pre-coated with such a material which is resistant to fusion with the weld material.

These and other objects, features and advantages of the present invention will become apparent from a consideration of the following description, taken in connection with the accompanying drawings, in which.

For a clear understanding of the invention, the following practical examples will now be described without in any way restricting the scope of the invention.

EXAMPLE I

A first set of two mild steel plates 3/16 inch and ⅜ inch thick respectively were button welded together face to face in conventional manner and a second set of identical mild steel plates 3/16 inch and ⅜ inch thick respectively were button welded together face to face in accordance with the present invention. In both cases MIG welding with a 1/16 inch diameter solid mild steel copper-coated welding wire and carbon dioxide screening gas was performed with a time controlled welding plant operating at 38 volts and 510 amperes. In the case of the conventional weld, the welding operation was conducted for a period of 2 seconds and in the case of the weld according to the invention, the welding operation was conducted for a period of 4 seconds. Furthermore, with the weld according to the invention a reflective screen of zirconia ceramic sprayed onto a mild steel substrate was used.

Figure 2:
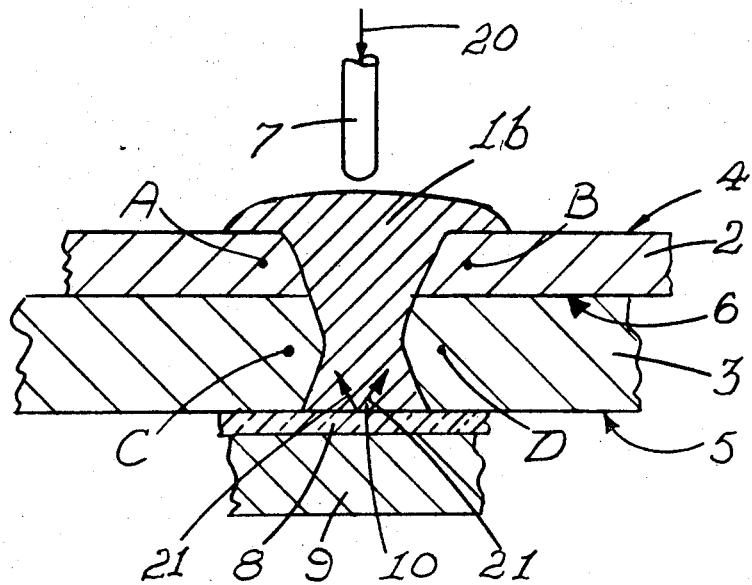
FIG. 2 is a view similar to FIG. 1 but showing a weld body obtained by the present invention.

The cross-sectional configuration obtained with the conventional welding is shown in FIG. I of the accompanying drawings and the cross-sectional configuration obtained with the welding according to the invention is shown in FIG. 2 of the drawings.

As soon as in FIG. 2, the welding according to the invention was carried out by directing a stream of molten weld metal through plates 2 and 3 from side 4 to side 5 in the direction of arrow 20 by means of welding wire 7.

Reflective ceramic screen 8 on mild steel substrate 9 is located on the side 5 of plate 3 opposite to welding wire 7 and acts to reflect molten weld metal and heat back against the stream of weld metal coming from wire 7, roughly in the direction of arrows 21. As a result, head 10 is formed within plate 3 on weld body 1b at surface 5.

Figure 1:
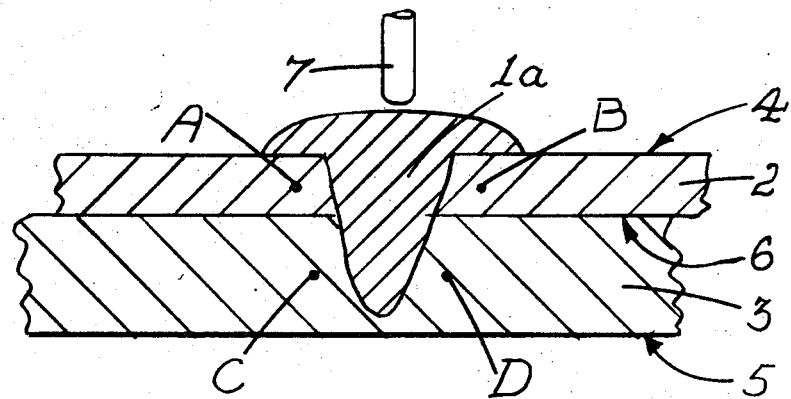
FIG. 1 shows in longitudinal section a weld body interconnecting two superposed workpieces, obtained according to the prior art.

The weld bodies 1a and 1b obtained with the welds of FIGS. I and 2 had the following cross-sectional dimensions:

| Cross-section at | Weld of FIG. 1. | Weld of FIG. 2. |
|---|---|---|
| outer face 4 from which weld performed | (15in/32) | (23in/32) |
| cross-section at inter-face 6 between two plates | (23in/64) | (9in/16) |
| Cross-section at opposite outer face 5. | Nil | (15in/32) |

The mean Brinell hardness number (2.5 mm/187.5 Kgf) of the weld body 1a of FIG. 1 was 233 and that of the weld body 1b of FIG. 2 was 193.

The Brinell hardness numbers (2.5 mm/187.5 Kgf) of the parent metals in different zones thereof outside the heat affected zones, are shown in the following table:

|  | Weld of FIG. 1. | Weld of FIG. 2. |
|---|---|---|
| ZONE A | 130 | 100 |
| ZONE B | 130 | 100 |
| ZONE C | 147 | 150 |
| ZONE D | 147 | 150 |

It will be seen that the hardness obtained with the weld of FIG. 2 in accordance with the invention is less than that obtained with the conventional weld of FIG. 1. As a result, a much more ductile weld is obtained with the weld of FIG. 2 in accordance with the invention.

It will be noticed that the cross-sectional dimension of the weld of FIG. 2 according to the invention at interface 6 is greater than that of the conventional weld of FIG. 1 at interface 6. The loss in shear strength of the weld of FIG. 2 according to the invention at interface 6 as a result of the decreased hardness is compensated for by the increase in cross-sectional dimension.

The head 10 formed on weld body 1b of FIG. 2 within plate 3 holds the weld body and the plates together more securely than is the case with the substantially V-shaped weld body of FIG. 1. Apart from holding plates 2 and 3 together more securely, weld body 1b of FIG. 2 also effectively binds together planes of weak grain cohesion within plates 2 and 3.

EXAMPLE II

Three sets of two mild steel plates 3/16 inch and ⅜ inch thick respectively were inch together by inserting a ½ diameter mild steel rivet hot into a 17/32 inch diameter reamered hole passing through both plates in each case. Three further sets of two mild steel plates 3/16 inch and ⅜ inch thick respectively were button welded together face to face in conventional manner as shown in FIG. 1 and yet another three sets of two mild steel plates 3/16 inch and ⅜ inch thick respectively were button welded together face to face in accordance with the invention as shown in FIG. 2. The plates were similar to those of Example I and the welds were performed in the same manner as those of Example 1. The nine specimens so obtained were tested by subjecting each pair of secured plates to a tensile test in order to determine the shear strength of the rivet or weld as the case may be at the interface of the pair of plates.

The following tensile breaking loads which are indicative of the shear strengths were obtained:

ULTIMATE BREAKING LOAD (lbs).

| SPECIMEN | a | b | c | MEAN |
| --- | --- | --- | --- | --- |
| Conventional weld according to FIG. 1. | 8,670 | 9,850 | 7,230 | 8,583 |
| Reflection welding according to FIG. 2. | 16,500 | 14,450 | 16,150 | 15,700 |
| ½" Diameter Rivet | 14,600 | 12,650 | 13,000 | 13,417 |

The mean Brinell hardness number (2.5 mm/187 Kgf) of the rivets after heat insertion was 226.

It will be seen that a button weld according to the invention can be produced having superior ductility and shear strength than those of the conventional weld of FIG. 1 and of the rivets.

From the cost point of view, depending upon local conditions, it is anticipated that the cost of button welding according to the invention could be as low as 30 percent of that of rivetting or permanent bolting and that seam welding according to the invention could similarly involve considerable savings.

Figure 3:
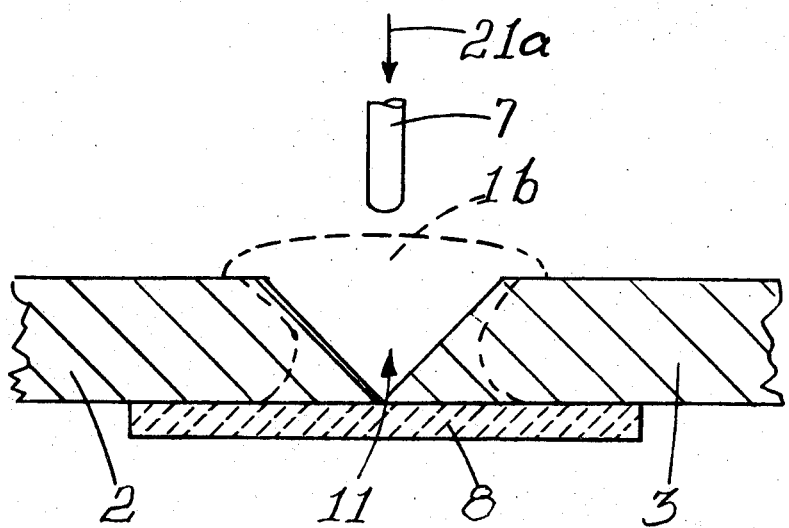
FIG. 3 is a view similar to that of FIG. 2 but showing the formation of a butt or seam weld.
Figure 4:
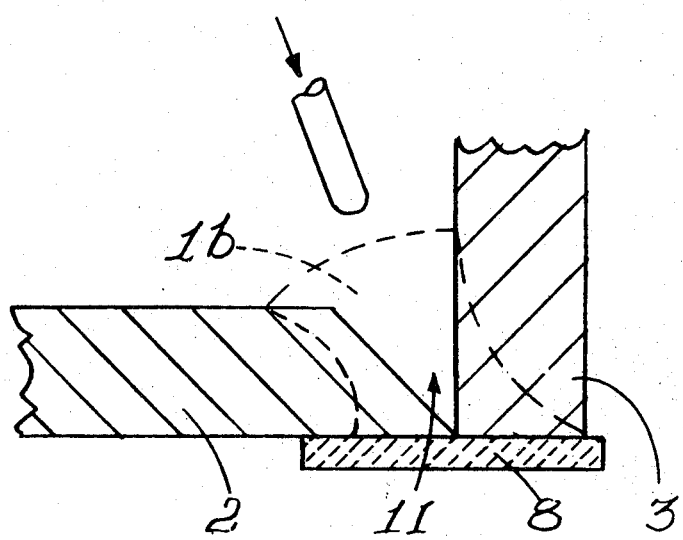
FIG. 4 is a view similar to FIGS. 2 and 3 but showing the formation of a corner weld.
Figure 5:
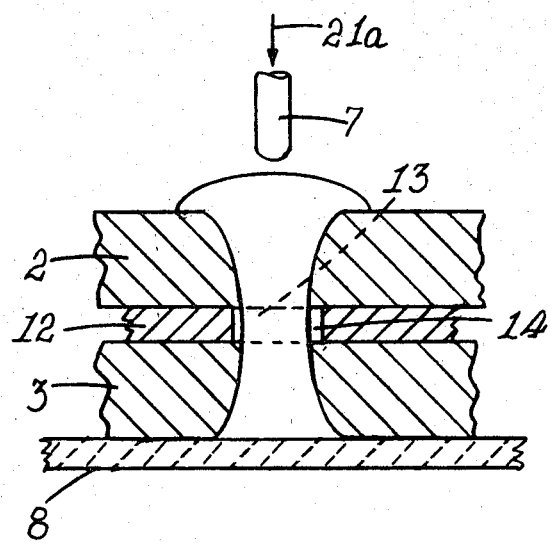

Further applications of the method according to the invention are illustrated in FIGS. 3, 4 and 5.

In FIG. 3, two plates 2 and 3 to be seam welded together are located in edge to edge relationship to each other and a screen 8, mounted on a suitable substrate (not shown) and similar to the one employed in the application illustrated in FIG. 2, is located to extend over one end of the gap 11 disposed between the free ends of plates 2 and 3.

Welding in the direction of arrow 21a by means of welding wire 7 is effected in similar manner as aforesaid. A weld body 1b (shown in dotted lines) of similar configuration as aforesaid is formed. If required extraneous filler material may also be introduced into gap 11 before or during the welding operation.

In FIG. 4 the welding together of two plates 2 and 3 at an angle is illustrated. The arrangement is similar to that illustrated in FIG. 3 and corresponding numbers are used to indicate corresponding integers.

FIG. 5 illustrates the welding together of plates such as 2 and 3 in a structure in which a certain degree of relative movement between the welded together plates, known as breathing, is required. A spacer 12, composed of a material which is resistant to fusion with the weld material and which includes an aperture 13 of larger cross sectional dimensions than the body of weld material initially passing through it is disposed between plates 2 and 3 in the zone of the weld.

When welding is effected with a similar arrangement and in similar manner as aforesaid aperture 13 is filled up with weld material on completion of the reflecting action. When the weld material cools it contracts in spacer aperture 13 leaving a clearance 14 between the weld material and the walls of aperture 13. "Breathing" between plates 2 and 3 is therefore possible and excessive stiffness of the structure may accordingly be minimized.

It will be appreciated that with a method of welding and a weld according to the invention many variations in detail are possible without departing from the scope of the appended claims.

What is claimed is:

1. A method of welding in a weld zone extending from one side to the other of at least one workpiece, which includes the steps of applying heat to the weld zone from one side of said at least one workpiece to said other side until molten weld material at least partly fills the weld zone, reflecting heat and deflecting molten weld material back from said other side of said at least one workpiece, maintaining weld material at the root of the weld and substantially throughout the remainder of the body of the weld material in a molten condition for a period of time sufficient to permit intimate fusion between the weld material and the material of said at least one workpiece at the root and substantially throughout the remainder of the weld and also to flare the weld material transversely at the root of the weld to form a weld body which has a head thereon within said at least one workpiece on said other side of said at least one workpiece at the root of the weld.

2. The method of claim 1 wherein the weld is a button weld.

3. The method of claim 1 wherein the heat is reflected by a screen comprising reflective material.

4. The method of claim 3 wherein the screen is composed of a material which is resistant to heat and to the weld material, has a low heat absorption so that it may reflect heat and is inert so as not to give off gas or any liquid or solid contaminating substance.

5. The method of claim 4 wherein the screen is a ceramic material.

6. The method of claim 3 wherein the screen is composed entirely of the reflective material and is thus of monolithic structure.

7. The method of claim 3 wherein the screen comprises reflective material mounted on a supporting substrate.

8. A method of welding in a weld zone extending from one side to the other of at least one workpiece, which includes the steps of applying heat to the weld zone from one side of said at least one workpiece to said other side until molten weld material at least partly fills the weld zone, reflecting heat and deflecting molten weld material back from said other side of said at least one workpiece to flare the weld material transversely at the root of the weld in order to form a weld body which has a head of thereon within at least one workpiece on said other side of said at least one workpiece at the root of the weld.

9. A method of welding from one side only of at least one workpiece which includes the steps of using a deeply penetrating welding process in a weld zone extending from said one side of said at least one workpiece to the other side thereof, reflecting heat and deflecting molten weld material back from said other side of said at least one workpiece with a reverberatory action to flare the weld material transversely at the root of the weld in order to produce a weld body in said at least one workpiece which has an hourglass configuration.

* * * * *